(12) United States Patent
White et al.

(10) Patent No.: US 7,782,858 B2
(45) Date of Patent: Aug. 24, 2010

(54) VALIDATING INTERNAL ROUTING PROTOCOL INFORMATION PASSED THROUGH AN EXTERNAL ROUTING PROTOCOL

(75) Inventors: Russell White, Holly Springs, NC (US); James Ng, Mebane, NC (US); Alvaro Retana, Raleigh, NC (US); Brian Weis, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 344 days.

(21) Appl. No.: 11/696,708

(22) Filed: Apr. 4, 2007

(65) Prior Publication Data
US 2008/0247392 A1 Oct. 9, 2008

(51) Int. Cl.
*H04L 12/28* (2006.01)
*H04L 12/56* (2006.01)
(52) U.S. Cl. ..................................... 370/392
(58) Field of Classification Search ........................ None
See application file for complete search history.

(56) References Cited

U.S. PATENT DOCUMENTS 7,136,374 B1* 11/2006 Kompella .................. 370/352
7,420,958 B1* 9/2008 Marques ..................... 370/351
2007/0076709 A1* 4/2007 Mattson et al. ............. 370/389

OTHER PUBLICATIONS

James Ng, Extensions to BGP Transport soBGP Certificates, draft-ng-sobgp-bgpextensions-01.txt, May 20, 2007, p. 14pp, Volume /sobgp/, Publisher: Cisco Systems, Inc. at ftp-eng.cisco.com , Published in: San Jose, CA US.
Brian Weis, Secure Origin BGP (soBGP) Certificates, draft-weis-sobgp-certificates-02.txt, Jul. 1, 2004, p. 39pp, Volume /sobgp/, Publisher: Csico Systems, Inc. at ftp-eng.cisco.com , Published in: San Jose, CA USA.
Russel White, Architecture and Deployment Considerations for Secure Origin BGP (soBGP), draft-white-sobgp-architecture-01a.txt, May 24, 2005, p. 21pp, Volume /sobgp/, Publisher: Cisco Ssytems, Inc. at ftp-eng.cisco.com, Published in: San Jose, CA USA.

* cited by examiner

*Primary Examiner*—Chirag G Shah
*Assistant Examiner*—Minh-Trang Nguyen
(74) *Attorney, Agent, or Firm*—Patent Capital Group

(57) ABSTRACT

In one embodiment, a method includes receiving authenticated site data that includes site ID data and address data. The site ID data indicates a unique site ID for each site among multiple sites for a first network that uses an internal routing protocol. Multiple edge sites of those sites are separate from each other and connected to a second network that is under separate administrative control of at least one different party. The address data indicates network addresses associated with each site of the plurality of sites. An external routing protocol message is discounted based on the authenticated site data.

25 Claims, 7 Drawing Sheets

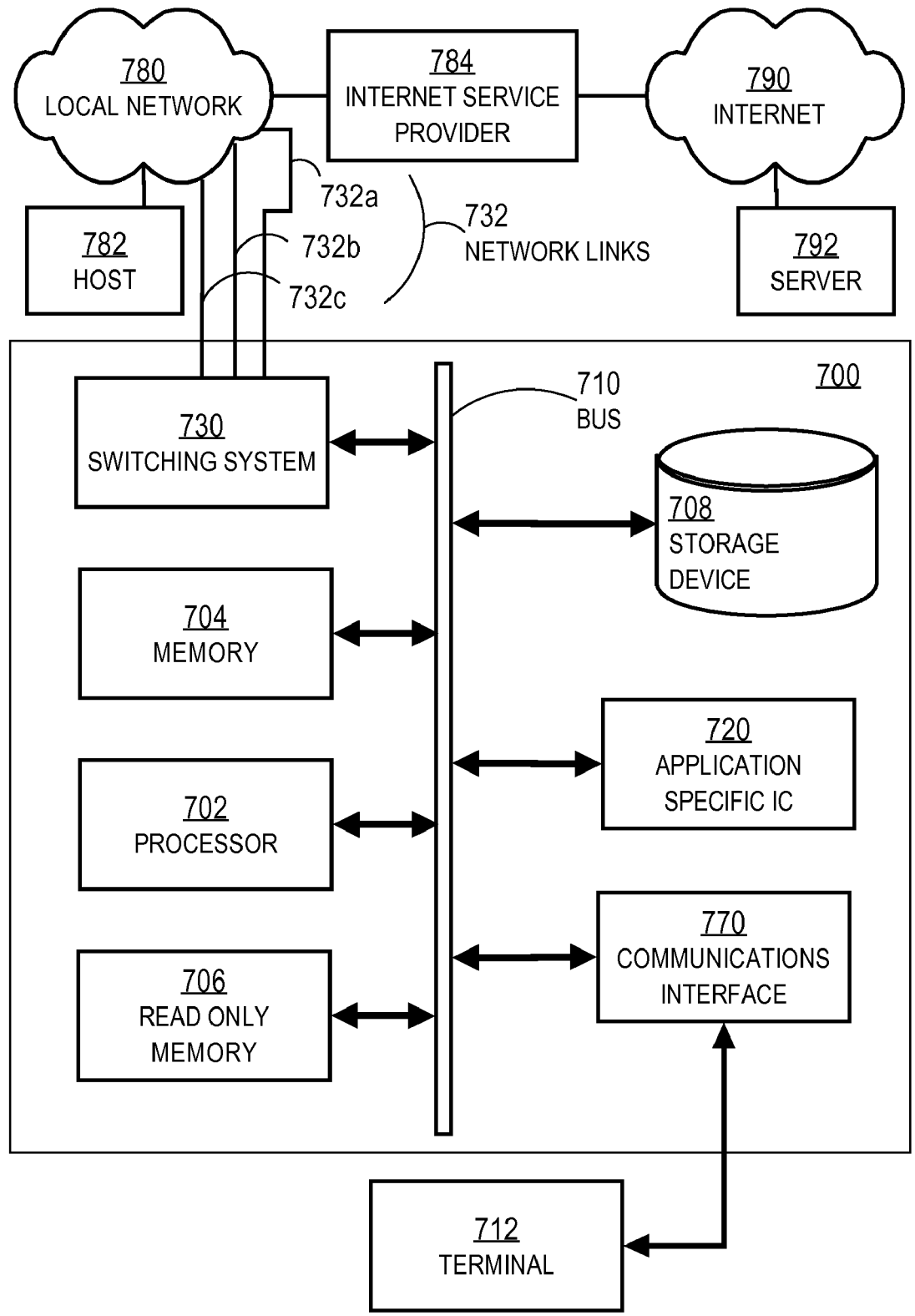

VALIDATING INTERNAL ROUTING PROTOCOL INFORMATION PASSED THROUGH AN EXTERNAL ROUTING PROTOCOL

BACKGROUND OF THE INVENTION

1. Field of the Invention

The present invention relates to passing routing information in a network under one party's administrative control that includes paths, such as layer 3 virtual private network paths, across a different network under a different party's administrative control.

2. Description of the Related Art

Networks of general purpose computer systems and specialized devices connected by external communication links are well known and widely used in commerce. The networks often include one or more network devices that facilitate the passage of information between the computer systems and devices. A network node is a network device or computer or specialized device connected by the communication links. An end node is a node that is configured to originate or terminate communications over the network. An intermediate network node facilitates the passage of data between end nodes.

Communications between nodes are typically effected by exchanging discrete packets of data. Information is exchanged within data packets according to one or more of many well known, new or still developing protocols. In this context, a protocol consists of a set of rules defining how the nodes interact with each other based on information sent over the communication links. A routing protocol is designed to provide information that is used by a routed protocol to determine which links to use at an intermediate network node to forward data packets across heterogeneous networks (called internetworks, including the Public Internet) that may use different physical media to form links between adjacent nodes or may be under different administrative control, or both. An intermediate network node that forwards data packets based on routing protocol information is called a router.

Network service providers (called "providers" hereinafter) offer wide area networks and sophisticated services that can allow geographically dispersed networks of one entity, called a "customer" hereinafter, to communicate. Example services include internetwork virtual private networks (VPNs). In these services, routing information at one customer site is converted from the internal routing protocol used by the customer at all sites to an external routing protocol used among service providers, and then back to the internal routing protocol at a second customer site. It would be useful if a node at the second customer site could check that the internal routing protocol information received is valid.

An autonomous system refers to a collection of nodes and routers under administrative control of a single entity. An autonomous system uses an internal routing protocol for passing routing information used within the autonomous system and an external routing protocol to pass routing information between different autonomous systems. Currently, some external routing protocols provide methods to check certain aspects of validity of routing information that has passed across several different autonomous systems. However, an autonomous system, such as a customer network, with multiple sites that rely on an external routing protocol to span one or more other autonomous systems to send routing information from a local site to a remote site is not currently able to check whether error, inattention or malfeasance in an intervening autonomous system has led to incorrect or misleading routing information being received at the remote site.

BRIEF DESCRIPTION OF THE DRAWINGS

The present invention is illustrated by way of example, and not by way of limitation, in the figures of the accompanying drawings and in which like reference numerals refer to similar elements and in which:

FIG. 7 illustrates a computer system upon which an embodiment of the invention may be implemented.

DESCRIPTION OF EXAMPLE EMBODIMENTS

Figure 1:
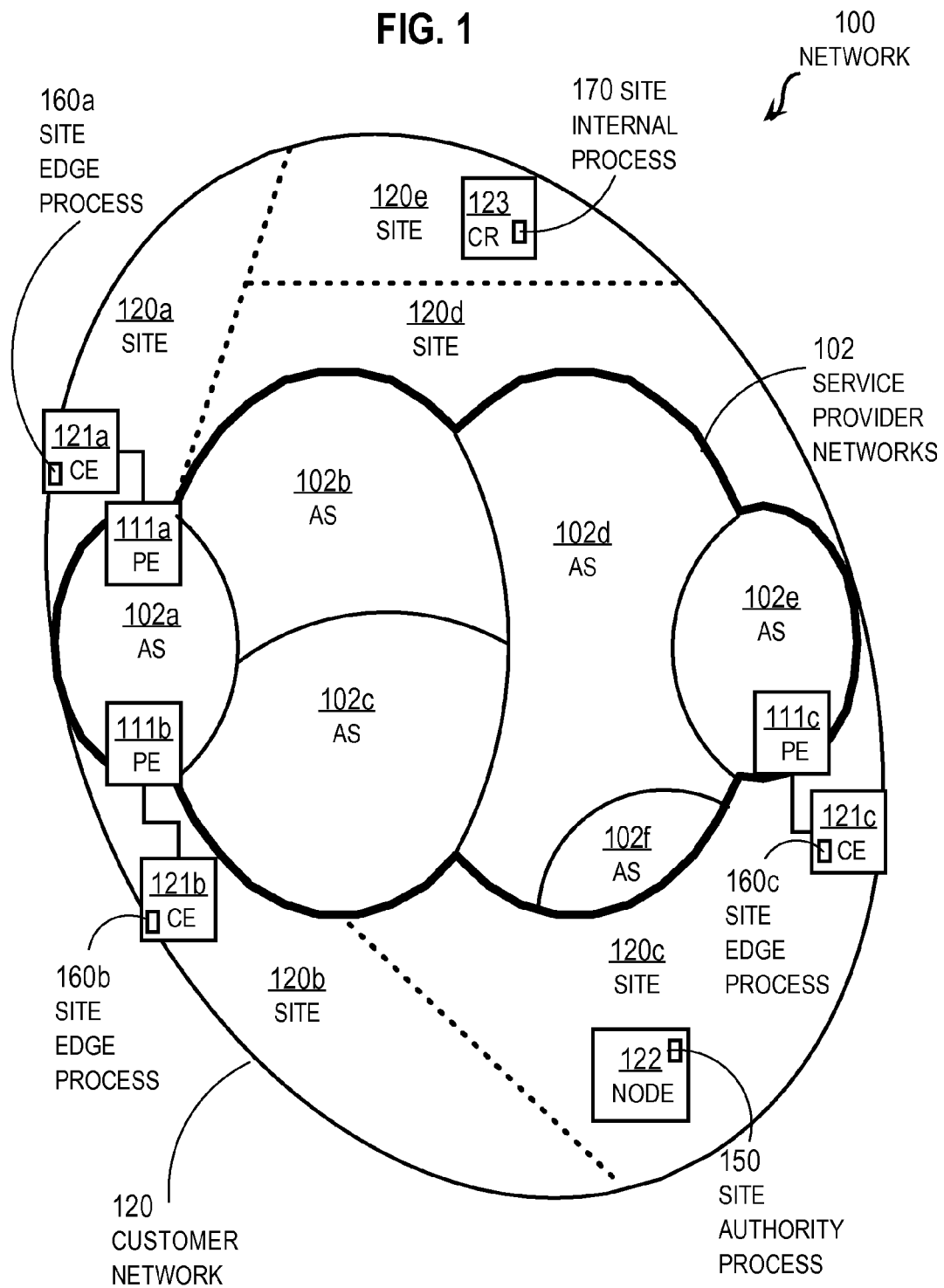
FIG. 1 illustrates an example network in which a customer network spans a provider network.

A method and apparatus are described for validating internal routing protocol information passed through an external routing protocol. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Example embodiments of the invention are described in the context of using the Enhanced Interior Gateway Routing Protocol (EIGRP) as an internal routing protocol on a customer network and the secure origin Border Gateway Protocol (soBGP) at gateway nodes to one or more provider networks over which internetwork (layer 3) virtual private networks (VPNs) have been established using the Multi-Protocol Label Switching Protocol (MPLS). However, the invention is not limited to this context, but may be practiced wherever a routing protocol used internally by one party is converted to a second routing protocol used by a different party to traverse a network under that different party's administrative control back to routers of the first party, whether using layer 3 VPNs or some other service on one or more intervening autonomous systems.

1.0 Overview

In one set of embodiments, a method includes receiving, at a particular node, authenticated site data that includes site ID data and address block data. The Site ID data indicates a unique site ID for each site among multiple sites for a first network that is under administrative control of a customer and that uses an internal routing protocol. Multiple edge sites of those sites are separate from each other and connected to a second network that is under separate administrative control of at least one network service provider. The address block data indicates a set of one or more network addresses that are associated with each site of the multiple sites. An external routing protocol message is discounted based on the authenticated site data.

In other sets of embodiments, an apparatus or software is configured to perform one or more steps of the above method.

2.0 Network Overview

Each packet communicated between nodes in a network typically comprises 1] header information associated with a particular protocol, and 2] payload information that follows the header information and contains information that may be processed independently of that particular protocol. Often, the data in the payload for the particular protocol includes a header and payload for a different protocol associated with a different layer of detail for information exchange. The protocol in the payload is said to be encapsulated in the protocol of the header for the payload.

The headers included in a packet traversing multiple heterogeneous networks, such as the Internet, typically include a physical (layer 1) header, a data-link (layer 2) header, an internetwork (layer 3) header and a transport (layer 4) header, as defined by the Open Systems Interconnection (OSI) Reference Model. The OSI Reference Model is generally described in more detail in Section 1.1 of the reference book entitled *Interconnections Second Edition*, by Radia Perlman, published September 1999, which is hereby incorporated by reference as though fully set forth herein.

An autonomous system is a portion of a network under the network administration of a single authority, such as an enterprise or Internet service provider (ISP). In an internetwork, networks in different autonomous systems (AS) also route data packets among each other. In general, the network nodes in an autonomous system are manually or automatically configured with an Autonomous System identifier (AS ID).

Routing information for an AS is summarized at its boundaries with one or more other ASs at intermediate network nodes called border gateway nodes or border gateway (BG) routers. Routing information shared within the borders of one AS is exchanged using an internal routing protocol also called an interior gateway protocol (IGP). Example IGPs include the link state protocols Open Shortest Path First (OSPF) and Intermediate System to Intermediate System (IS-IS). Another IGP, developed by CISCO SYSTEMS, INC.™ of San Jose, Calif. for use in its routers, is the Enhanced Interior Gateway Routing Protocol (EIGRP).

An external routing protocol (also called a level 3 routing protocol) is used to exchange route summary and routing policy information across AS borders. For example, the Border Gateway Protocol (BGP) is a level 3 routing protocol. The BGP is used to send summary and policy information between adjacent boundary gateway nodes in different ASs using the External BGP (EBGP). The BGP sends summary and policy information between different boundary gateways in the same AS using the Internal BGP (IBGP). In BGP, one or more attributes are sent with each route, including an AS_PATH attribute. The AS_PATH attribute indicates the AS ID of the BG router that advertised the route and the AS ID of any different AS for which a BG router passes the routing information along.

2.1 Network Structure

FIG. 1 illustrates an example network 100 in which a customer network 120 spans a provider network 102. Network 100 includes provider networks 102 including provider autonomous areas AS 102*a*, AS 102*b*, AS 102*c*, AS 102*d*, AS 102*e* and AS 102*f*, and a customer AS called customer network 120. Customer network 120 includes multiple customer sites including site 120*a*, site 120*b*, site 120*c*, site 120*d* and site 120*e*. Customer network 120 excludes service provider networks 102. Customer network 120 procures services from provider networks 102, such as a MPLS VPN, to communicate among two or mores sites.

Each autonomous area includes multiple routers and end nodes. As depicted in FIG. 1, AS 102*a* includes provider edge (PE) router 111*a* and PE router 111*b* to serve as gateway routers with site 120*a* and site 120*b*, respectively, of customer network 120. Similarly, AS 102*e* includes PE router 111*c* to serve as gateway router with site 120*c* of customer network 120. PE router 111*a*, PE router 111*b*, PE router 111*c* and others, not shown, are collectively referenced hereinafter as PE routers 111. Gateway routers between adjacent provider AS are not shown. Site 120*a* includes customer edge (CE) router 121*a* connected to PE router 111*a*. Similarly, site 120*b* includes CE router 121*b* connected to PE router 111*b*; and site 120*c* includes CE router 121*c* connected to PE router 111*c*. CE router 121*a*, CE router 121*b*, CE router 121*c* and others, not shown, are collectively referenced hereinafter as CE routers 121. In the illustrated embodiment, as described in more detail below, site 120*d* and 120*e* are connected to site 120*a* and not directly to provider networks 102. Customer network 120 also includes internal node 122 and customer router (CR) 123 that are not at an edge with the provider networks 102.

Although a certain number of provider AS and PE routers 111 and customer sites and CE routers 121 and other customers nodes 122, 123 are shown for purposes of illustration, in other embodiments a network includes one or more changes in a number of provider AS, customer sites, PE routers, CE routers or other customer nodes.

According to the illustrated embodiment, a site authority process 150 is included in node 122, site edge processes 160*a*, 160*b*, 160*c* are included in CE routers 121*a*, 121*b*, 121*c*, respectively, and a site internal process 170 is included in CR 123. The site edge processes 160*a*, 160*b*, 160*c* are collectively referenced hereinafter as site edge process 160. These processes 150, 160, 170 are utilized in the illustrated embodiment to validate internal routing protocol information that has traversed the provider networks 102 in one or more external routing protocol messages. In other embodiments, one or both of site authority process 150 and site internal process 170 are included in other nodes of network 100 in addition to or instead of the depicted nodes 122 and 123, respectively. In some embodiments, the site edge processes 160 are included in PE routers 111 instead of or in addition to being included in CE routers 121. The processes 150, 160, 170 implement a modified version of the validation provided for BGP traffic among AS by the secure origin BGP (soBGP). By the modified process, trusted site routing information is passed between multiple sites within a single AS and subsequent routing information updates are checked against the trusted information.

2.2 Secure Origin BGP

Secure origin BGP (soBGP) is described by R. White "Architecture and Deployment Considerations for Secure Origin BGP (soBGP)," Published by Cisco Systems, Inc., San Jose, Calif., 24 May 2005, 21 pp (hereinafter White); and by J. Ng, "Extensions to BGP Transport soBGP Certificates," Published by Cisco Systems, Inc., San Jose, Calif., 20 May 2005, 15 pp (hereinafter Ng); and by B. Weis "Secure Origin BGP (soBGP) Certificates," Published by Cisco Systems, Inc., San Jose, Calif., July 2004, 39 pp (hereinafter Weis); the entire contents of each of which are hereby incorporated by reference as if fully set forth herein. White, Ng and Weis can be found at the time of this writing in files named draft-whitesobgp-architecture-01a.txt, draft-ng-sobgp-bgpextensions-01.txt, and draft-weis-sobgp-certificates-02.txt, respectively, available via a file transfer protocol (ftp) site at Internet domain ftp-eng.cisco.com in the directory sobgp; or at the World Wide Web at Internet domain ietf.org in the directory Drafts or at domain watersprings.org in the directory /pub/id/. The soBGP references cited above apply only to BGP as the external routing protocol among multiple AS and does not apply to different sites within one AS, such as sites in customer network 120. Relevant aspects of soBGP for the illustrated embodiment of the present invention are described in this section.

According to soBGP, certain information about multiple ASs, which information is expected to be relatively limited and infrequently changed, is shared using messages that are authenticated using digital signatures so that the configuration data received can be trusted. Such exchanges are too costly of network resources to be used for routine routing updates which are frequent and voluminous. The trusted configuration information indicates the block of network addresses that are reserved for assignment to nodes in each AS. The trusted configuration information also indicates which ASs are connected to each AS. Subsequent routine BGP update messages are not authenticated, but instead are checked against the trusted configuration data. An update that is not consistent with the trusted configuration data is considered suspect and is discounted. For example, in some embodiments, a "trust level" is set, which is used in the decision process to determine which path to use. A specific piece of routing information can be labeled as completely untrusted, which means it would not be used even if it's the only path available. It can be labeled with some other level of trust, which means it will be used if it's the only path available. It can be labeled with yet another trust level, which means always use this path over all other available paths. It can be labeled with a trust label meaning anything in between. A finely grained grading system is available within soBGP to set a trust level.

It is assumed that each AS has an AS ID and a public key known to each participant in the network (e.g., provider networks 102) and that at least one administrator for each AS knows a private key that is paired with the public key for that AS ID. The formation and distribution of public key/private key pairs is well known in the art and is not described further here. One method is described in RFC3279, by T. Bates et al, "Algorithms and Identifiers for the Internet X.509 Public Key Infrastructure Certificate and Certificate Revocation List (CRL) Profile," April 2002, the entire contents of which are hereby incorporate by reference as if fully set forth herein. RFC3279 and other RFCs are available in directory /rfc/ on World Wide Web domain ietf.org. RFC3279 is found in file rfc3279.txt in that directory. A private key can not be deduced from the public key; but, any data string that is encoded by one key to produce a cipher can be decoded using the other key to reproduce the data string from the cipher. The soBGP documents cited above describe multiple methods for distributing AS IDs and public key/private key pairs so that each recipient of this information can trust the information received.

Figure 2A:
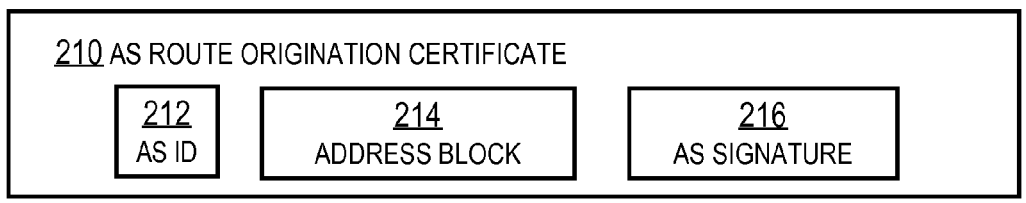
FIG. 2A illustrates an example route origination certificate for an autonomous system.

FIG. 2A illustrates an example route origination certificate 210 for an autonomous system. The route origination certificate 210 includes an AS ID field 212, an address block field 214 and an AS signature field 216. The AS ID field includes data that indicates an AS ID for one of the AS communicating via BGP. The address block field 214 holds data that indicates one or more ranges of addresses that form a pool for routes that originate within the AS indicated by the AS ID in the AS ID field 212. The AS signature field 216 holds data that indicates the data in the other fields have not been altered since the certificate 210 was generated. For example, a sender uses a private key associated with the AS ID to encode the AS ID and address block (or a hash thereof to a fixed field length string) and puts the resulting cipher in the AS signature field 216. A recipient decodes the cipher in the AS signature field 216. If it matches the contents of the AS ID field 212 and address block field. 214 (or the hash thereof), then the contents of those fields are authenticated and can be trusted.

The contents of the AS ID field 212 and address block field received at any AS from all the other AS in a network is used to associate a list of addresses with each AS. For purposes of illustration, it is assumed that in provider networks 102, multiple AS route origination certificates are received at each AS. The certificates indicate each AS is associated with address blocks given in Table 1, where an AS ID is indicated by "ASx" where the letter x is replaced by the letter of the callout number of an AS in FIG. 1; thus the AS ID for AS 102a is ASA. It is further assumed for purposes of illustration that address blocks are Internet Protocol version 4 (IPv4) addresses of four octets, each octet represented by a decimal number between 0 and 255 and separated by dots. A range of addresses with the same leading bits is called a mask and is represented by "/n" following a base address, where the letter n is replaced by a decimal number that indicates the number of leading bits that are the same.

TABLE 1

Example address blocks associated with AS in provider networks 102

| AS ID | Address block |
| --- | --- |
| ASA | 171.0.0.0/8 |
| ASB | 172.0.0.0/8 and 182.0.0.0/8 |
| ASC | 173.0.0.0/8 |
| ASD | 174.0.0.0/8 and 164.0.0.0/8 |
| ASE | 175.0.0.0/8 |
| ASF | 176.0.0.0/8 |

Figure 2B:
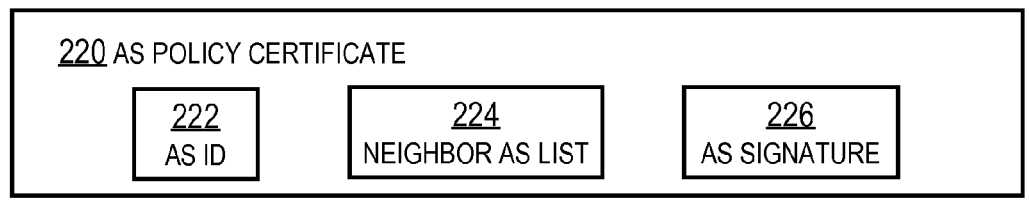
FIG. 2B illustrates an example autonomous system policy certificate.

FIG. 2B illustrates an example autonomous system policy certificate 220. The AS policy certificate 220 includes an AS ID field 222, a neighbor AS list field 224 and an AS signature field 226. The AS ID field includes data that indicates an AS ID for one of the AS communicating via BGP. The neighbor AS list field 224 holds a list of AS IDs of AS that are connected directly to the AS indicated by the AS ID in field 222. The AS signature field 226 holds data that indicates the data in the other fields have not been altered since the certificate 220 was generated, as described above. Thus the contents of those fields can be authenticated and trusted.

The contents of the neighbor AS list field 224 received at any AS from all the other AS in a network is used to establish a directional asynchronous graph (DAG) of all such connections. Only connections that are reported by both AS are placed in the DAG. Thus one AS can not unilaterally pretend to be connected to another. For purposes of illustration, it is assumed that in provider networks 102, multiple AS policy certificates are received at each AS that indicate AS 102a is connected to AS 102b and AS 102c; AS 102b is connected to AS 102a, AS 102c and AS 102d etc. As a result, each AS in provider network 102 produces a DAG with this same information (e.g., indicated by circles and connecting arrows in FIG. 4, described in more detail in the next section). Each AS may trust the DAG so produced.

Figure 2C:
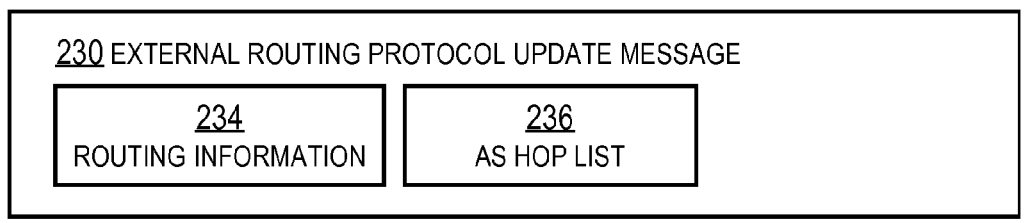
FIG. 2C illustrates an example external routing protocol update message for autonomous systems.

FIG. 2C illustrates an example external routing protocol update message 230 for autonomous systems. The external routing protocol update message 230 includes a routing information field 234 and an AS hop field 236. The routing information field 234 holds data that indicates a node in the network and addresses reachable from that node. The AS hop list 236 indicates each different AS that passed the update message. In BGP the AS hop list field 236 is called the AS_PATH attribute field. For example, in an update message that originated in AS 102a and travels through AS 102b to AS 102d to reach AS 102e, the AS hop list field 236 holds data that indicates ASA, ASB, ASD. At AS 102e, ASE is added to the AS_PATH attribute.

While the heavy processing involved in generating and verifying signatures are suitable for small messages like the certificates 210 and 220, it is too great a burden to place on every BGP update message. Thus there is no signature field in update message 230. Instead, the data in these fields is checked against the trusted data. If the data in the update is consistent with the data in the trusted routing configuration information, then the update message is accepted as valid. If not, the message is discarded or otherwise discounted.

It is assumed for purposes of illustration that an update message arrives at AS 102e with a new route to address 176.1.1.1 and AS hop list that indicates ASA, ASB, ASD. It is determined that this is inconsistent with the trusted information in Table 1, because the address does not begin with 171 as required for a source in AS 102a that has ID ASA. Thus the update message is rejected as invalid, even without checking a signature in the update message 230.

It is further assumed for purposes of illustration that another update message claims a new route to address 171.1.1.1 and an AS hop list indicates ASA, ASD. It is can be determined that this is inconsistent with the trusted information about AS neighbors, because ASA (ID for AS 102a) is not connected to ASD (ID for AS 102d). Thus the update message is rejected as invalid, even without checking a signature in the update message 230.

3.0 Secure Site Routing Information

According to an illustrated embodiment, certain configuration information about multiple sites within one AS is shared using messages that are authenticated using digital signatures so that the site configuration data received can be trusted. Subsequent routing update messages are checked against the trusted configuration data.

It is assumed that each site has an Site ID and a public key known to each site in the customer network (e.g., customer network 120) and that at least one administrator for each site knows a private key that is paired with the public key for that Site ID. The formation and distribution of public key/private key pairs is well known in the art and is not described further here. Any method may be used for distributing Site IDs and public key/private key pairs so that each recipient of this information can trust the information received.

For example, a site authority process 150 on a node 122 in the customer network 120 distributes Site IDs and associated private key pairs to a process at each site. The site authority process may be operated by a human administrator with credentials that authorize the human administrator to provide trusted data using the site authority process 150. The site authority process 150 distributes the private key to each site. In some embodiments, some or all of the site authority process 150 operates on a node in the provider networks 102 instead of or in addition to the customer network 120.

In various embodiments, any node on the site can accept the private key. In an illustrated embodiment, a site edge process 160 receives the private key for the site. In other embodiments, a process on each of one or more other nodes in the site accepts the private key for the site. In the illustrated embodiment, the site edge process 160 resides and executes on a CE router 121. In some embodiments, the site edge process 160 resides and executes on a PE router 111 connected to a site of the customer network 120.

The site authority process 150 also distributes the public key associated with each site ID. Thus the site IDs and associated public keys are known to any node on customer network 120. In some embodiments, the site edge process 160 independently derives its public key/private key pair, and obtains a certificate containing its public key, as described in RFC3279, the entire contents of which are hereby incorporated by reference as if fully set forth herein. Means of obtaining a public key certificate are well known in the art and are not described further here.

Figure 3A:
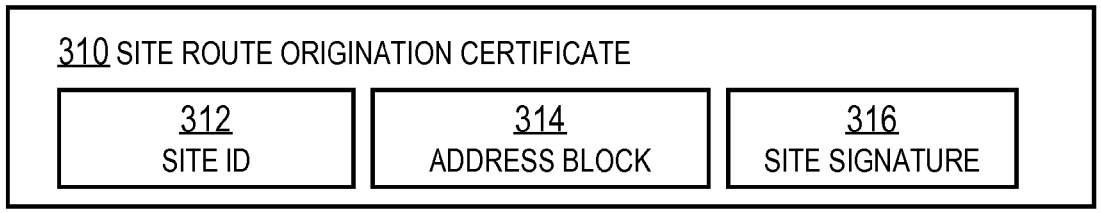
FIG. 3A illustrates an example site route origination certificate.

FIG. 3A illustrates an example site route origination certificate 310. The site route origination certificate 310 includes a site ID field 312, an address block field 314 and a site signature field 316. The site ID field 312 includes data that indicates a site ID for one of the sites in the customer network 120. The address block field 314 holds data that indicates one or more ranges of addresses that form a pool for routes that originate within the site indicated by the site ID in the site ID field 312. The site signature field 316 holds data that indicates the data in the other fields have not been altered since the certificate 310 was generated. For example, a sender uses a private key associated with the site ID to encode the site ID and address block (or a hash thereof to a fixed field length string) and puts the resulting cipher in the site signature field 316. A recipient decodes the cipher in the site signature field 316 using the public key for the site ID indicated in site ID field 312. If it matches the contents of the site ID field 312 and address block field 314 (or the hash thereof), then the contents of those fields are authenticated and can be trusted.

Although data fields are shown in FIG. 3A and subsequent figures as integral blocks in a particular order within a single data packet, in other embodiments one or more fields, or portions thereof, may appear in a different order spread over multiple data packets. In some embodiments additional fields are included. For example, in some embodiments, site route origin certificate 310 includes an AS number, and certificate 310 describes a portion of address space assigned to the AS.

The contents of the site ID field 312 and address block field 314 received at any site from all the other sites in one AS are used to associate a list of addresses with each site ID. For purposes of illustration, it is assumed that in customer network 120, multiple site route origination certificates are received at each site. The certificates indicate each site is associated with address blocks given in Table 2, where a Site ID is indicated by "SiteX" where the letter x is replaced by the letter of the callout number of a site in FIG. 1; thus the site ID for site 120a is SiteA. It is further assumed for purposes of illustration that address blocks are IPv4 addresses.

TABLE 2

Example address blocks associated with sites in customer network 120

| Site ID | Address block |
|---------|---------------|
| SiteA   | 10.1.0.0/16   |
| SiteB   | 10.2.0.0/16   |
| SiteC   | 10.3.0.0/16   |
| SiteD   | 10.4.0.0/16   |
| SiteE   | 10.5.0.0/16   |

Figure 3B:
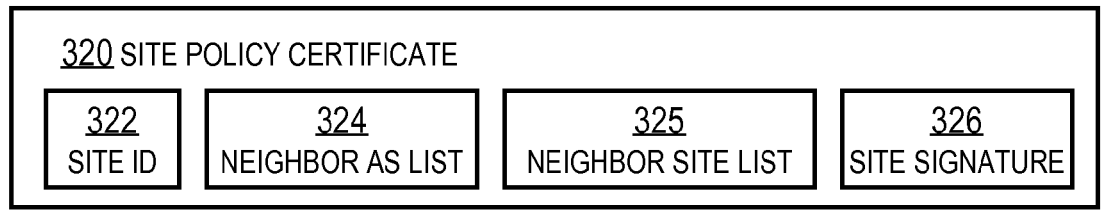
FIG. 3B illustrates an example site policy certificate.

FIG. 3B illustrates an example site policy certificate 320. The site policy certificate 320 includes a site ID field 322, a neighbor AS list field 324 and a neighbor site list field 325 and a site signature field 326. The site ID field includes data that indicates a site ID for one of the sites in the customer network 120. The neighbor AS list field 324 holds a list of AS IDs of AS that are connected directly to the site indicated by field 322. The neighbor site list field 325 holds a list of site IDs of sites that are connected directly to the site indicated by field 322. The site signature field 326 holds data that indicates the data in the other fields have not been altered since the certificate 320 was generated, as described above. Thus the contents of those fields can be authenticated and trusted. In some embodiments additional fields are included. For example, in some embodiments, certificate 320 includes an AS number, and certificate 320 describes adjacencies to the AS The contents of the neighbor AS list field 324 and neighbor site list field 325 received at any site from all the other sites in a customer network are used to establish a site sensitive DAG of all such connections. Only site connections that are reported by both parties are placed in the DAG. One way site connections to an AS are accepted unless a PE router in the AS participates. Thus one site can not unilaterally pretend to be connected to another. For purposes of illustration, it is assumed that the PE routers participate and that multiple site policy certificates and multiple AS policy certificates are received at an edge node between the customer network 120 and the provider networks 102. This edge node is either a PE router 111 or a CE router 121 or both. The policy certificates received indicate not only the AS connections described above but also the site connections, such as site 120*a* is connected to AS 102*a*, site 120*b* is connected to AS 102*a* and site 120*c* is connected to AS 102*e*. In some embodiments, a site is connected only to an AS not to another site. In the illustrated embodiment, one site can be connected to another site. Any site connected to an AS is called an edge site, while sites connected only to other sites are called interior sites. In the illustrated embodiment, site 120*d* and site 120*e* are connected to site 120*a* but not to each other. As a result, each edge node, at least, produces a DAG with this same information. Because these certificates are signed, each edge node may trust the DAG so produced.

Figure 4:
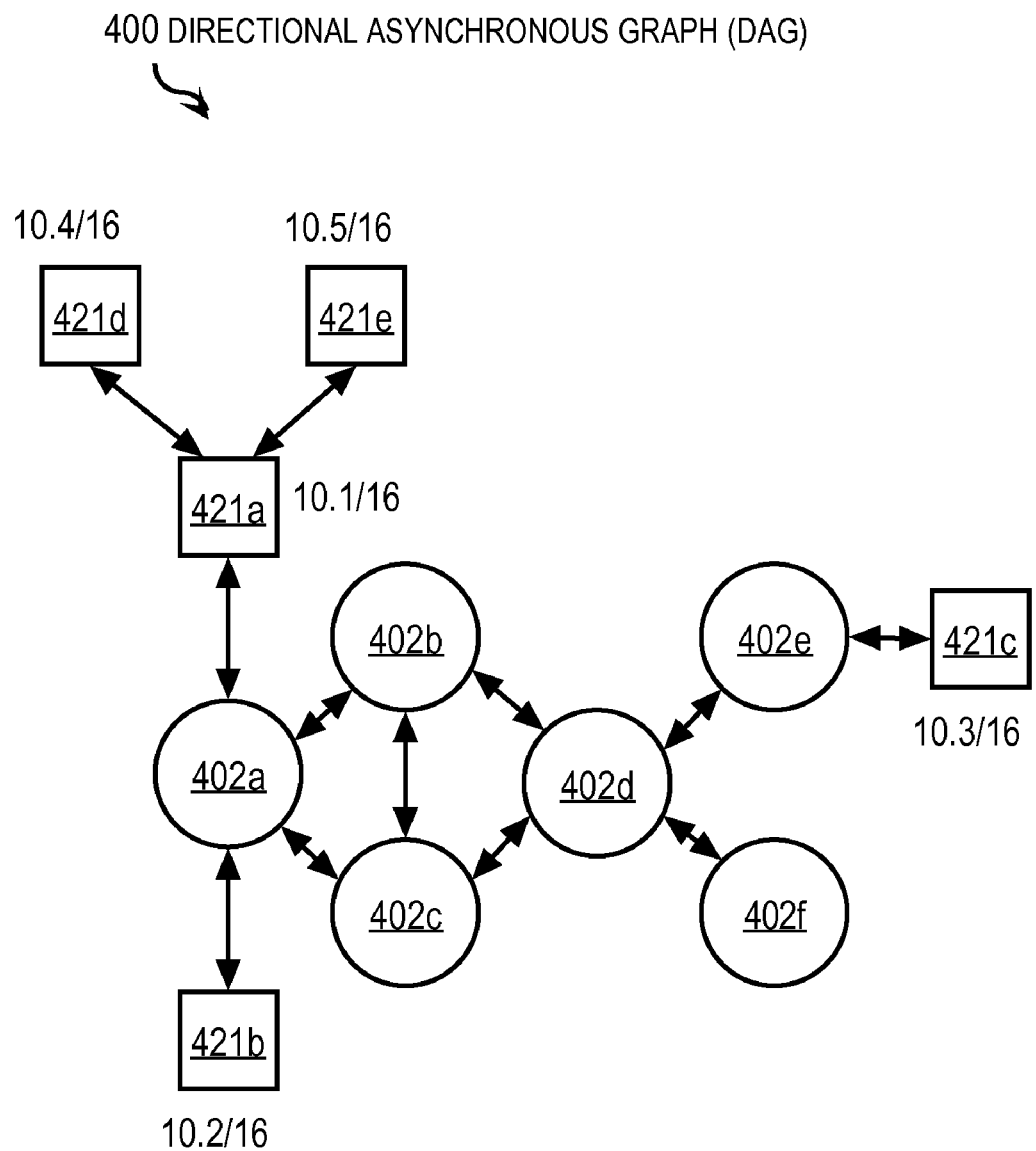
FIG. 4 illustrates an example site aware directional asynchronous graph constructed from site certificates.

FIG. 4 illustrates an example site aware directional asynchronous graph 400 constructed from site certificates. The DAG 400 includes the two way connections among AS reported in the AS policy certificates as two way arrows between circle node 402*a*, circle node 402*b*, circle node 402*c*, circle node 402*d*, circle node 402*e* and circle node 402*f*, that represent AS 102*a*, AS 102*b*, AS 102*c*, AS 102*d*, AS 102*e*, AS 102*f*, respectively. Also included in DAG 400 are the two way connections with sites reported in the site policy certificates as two way arrows connecting square node 421*a*, square node 421*d*, square node 421*e*, square node 421*b* and square node 421*c* that represent site 120*a*, site 120*d*, site 120*e*, site 120*b* and site 120*c*, respectively. Also in DAG 400, the address block associated with each site is associated with each square node. Thus address block 10.1/16 is associated with square node 421*a*, address block 10.2/16 is associated with square node 421*b*, address block 10.3/16 is associated with square node 421*c*, address block 10.4/16 is associated with square node 421*d*, and address block 10.5/16 is associated with square node 421*e*. In embodiments in which the PE routers 111 do not participate, the site sensitive DAG excludes circle nodes 402*b*, 402*c*, 402*d* and 402*f* that are not connected to any site, and circle node 402*a* is presumed connected to circle node 402*e*. In either case, all the information presented in site sensitive DAG is authorized by signatures and can be trusted.

Figure 3C:
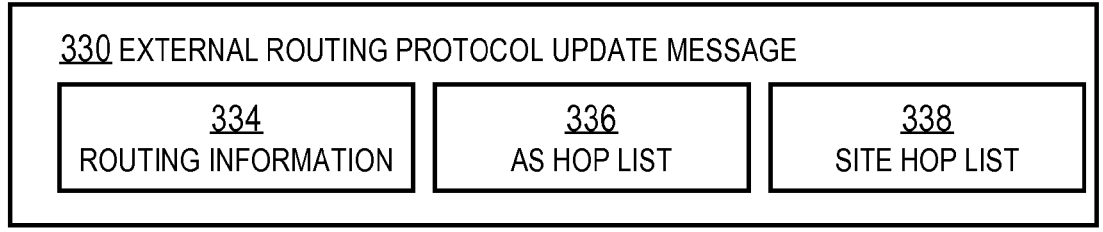
FIG. 3C illustrates an example external routing protocol update message with site hop data.

FIG. 3C illustrates an example external routing protocol update message 330 with site hop data. The external routing protocol update message 330 includes a routing information field 334 and an AS hop field 336 and a site hop list field 338. The routing information field 334 holds data that indicates a node in the customer network and customer addresses reachable from that node. The AS hop list field 336 indicates each different AS that passed the update message, for example in the AS_PATH attribute in BGP. The site hop list field 338 indicates each different site that passed the update message. Any method may be used to add the site hop list field 338 to an external routing protocol update message, for example with optional type-length-value (TLV) fields permitted by many protocols. In some embodiments using BGP as the external routing protocol, the site hop list field 338 is attached as IGP tags; and in other such embodiments the site hop list data is translated into BGP communities and the field 338 is attached as BGP communities.

For example, in an update message that originated in site 120*a* and travels through AS 102*a* to reach site 120*b*, the site hop list field 236 holds data that indicates SiteA and the AS hop list field holds data that indicates ASA. In the illustrated embodiment, sites may be connected to other sites and a routing update message could originate in site 120*e* behind site 120*a*. For an update message that originates in site 120*e* and travels through provider network 102 to reach site 120*c*, the site hop list field 236 holds data that indicates SiteE, SiteA and the AS hop list field holds data that indicates ASA, ASB, ASD, ASE.

Figure 3D:
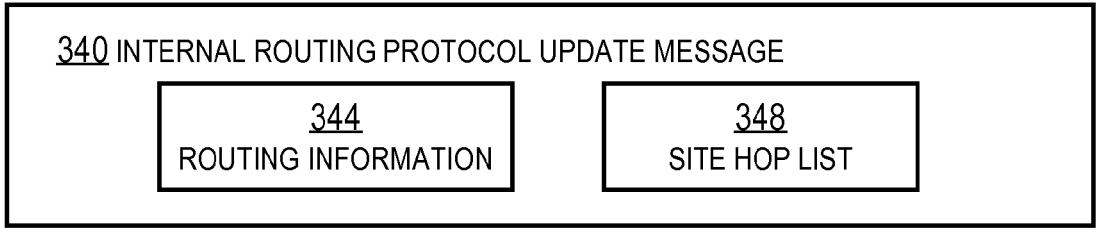
FIG. 3D illustrates an example internal routing protocol update message with site hop data.

FIG. 3D illustrates an example internal routing protocol update message 340 with site hop data. The internal routing protocol update message 340 includes a routing information field 344 and a site hop list field 348. The routing information field 344 holds data that indicates a node in the customer network and customer addresses reachable from that node. The site hop list field 348 indicates each different site that passes the update message before reaching the provider network 102. Any method may be used to add the site hop list field 348 to an internal routing protocol update message, for example with optional type-length-value (TLV) fields permitted by many protocols.

In embodiments in which sites occur more than one deep behind other sites, the site hop list field 348 is used to determine the path through the sites that the internal message has taken before reaching the edge node that will load the routing information into the external routing protocol update message. This provides a further constraint that can be tested at a remote site when an external routing protocol update messages is received. If it is assumed for purposes of illustration that site 120*d* is not connected to site 120*a* or provider networks 102 but instead is connected to site 120*e*, then updates from site 120*d* pass first to site 120*e* then to site 120*a*. For site 120*a* to be aware of site 120*d*, the site hop list field 348 is used, for example, in site internal process 170 on CR 123 in site 120*e*. An internal routing protocol message arrives at CE node 121*a* with SiteD, SiteE and SiteA in the site hop list 348. This is loaded into site hop list 338 when the external routing protocol update message 330 is generated at CE node 121*a* (or PE node 111*a*).

In some embodiments, sites are allowed to be only one deep behind an edge site. In some such embodiments in which the CE router 121 generates the external routing protocol update message, site hop list field 348 is omitted from an internal routing protocol message. In such embodiments, the CE router knows its own site ID and knows the site ID of the site which sent the internal message by virtue of the address block of the source address in the IP header. Thus the CE router 121 can determine the site IDs to place in the site hop list 338 in the external routing protocol update message 330.

While the heavy processing involved in generating and verifying signatures are suitable for small messages like the certificates 310 and 320, it is too great a burden to place on every BGP update message 330. Thus there is no signature field in update message 330. Instead, the data in these fields is checked against the trusted data. If the data in the update is consistent with the data in the trusted routing configuration information, then the update message is accepted as valid. If not, then the message is discarded or otherwise discounted.

If it is assumed for purposes of illustration that an edge node with DAG 400 available receives an external routing protocol message with an address not associated with the source site ID, then the external routing protocol message is discarded. For example a message that includes SiteA in the site hop list field 338 but has routing information for address 10.10.1.1 is found invalid and discarded.

If it is assumed for purposes of illustration that the edge node with DAG 400 available receives an external routing protocol message with data in AS hop list and site hop list that is inconsistent with the DAG, then the external routing protocol message is discarded. For example, a message that includes SiteA in the site hop list field 338 and ASB as the first hop in the AS hop field 336 is found invalid and discarded even without checking a signature in the update message 230 because square node 421a with site ID of SiteA is not connected to circle node 402b with AS ID of ASB in DAG 400.

In some embodiments, all nodes in a customer network that can reach each other without recourse to the provider networks are in a single site and all sites are edge sites.

In some embodiments, each CE router 121 alone constitutes an edge site and sites are allowed to be one or more deep behind another site. For example site 120a includes only CE router 121a and all other nodes that reach CE router 121a without recourse to provider networks 102 are in one or more sites like site 120e behind site 120a. Such embodiments will usually cause at least two site IDs to appear in each site hop list field 338. This is useful when two or more geographically separate campuses reach the provider networks 102 through the same CE router 121a. This is also useful for validity checks because it decreases exponentially the chances that uninformed data in the site hop list will be found valid.

4.0 Method for Validating Updates

Figure 5:
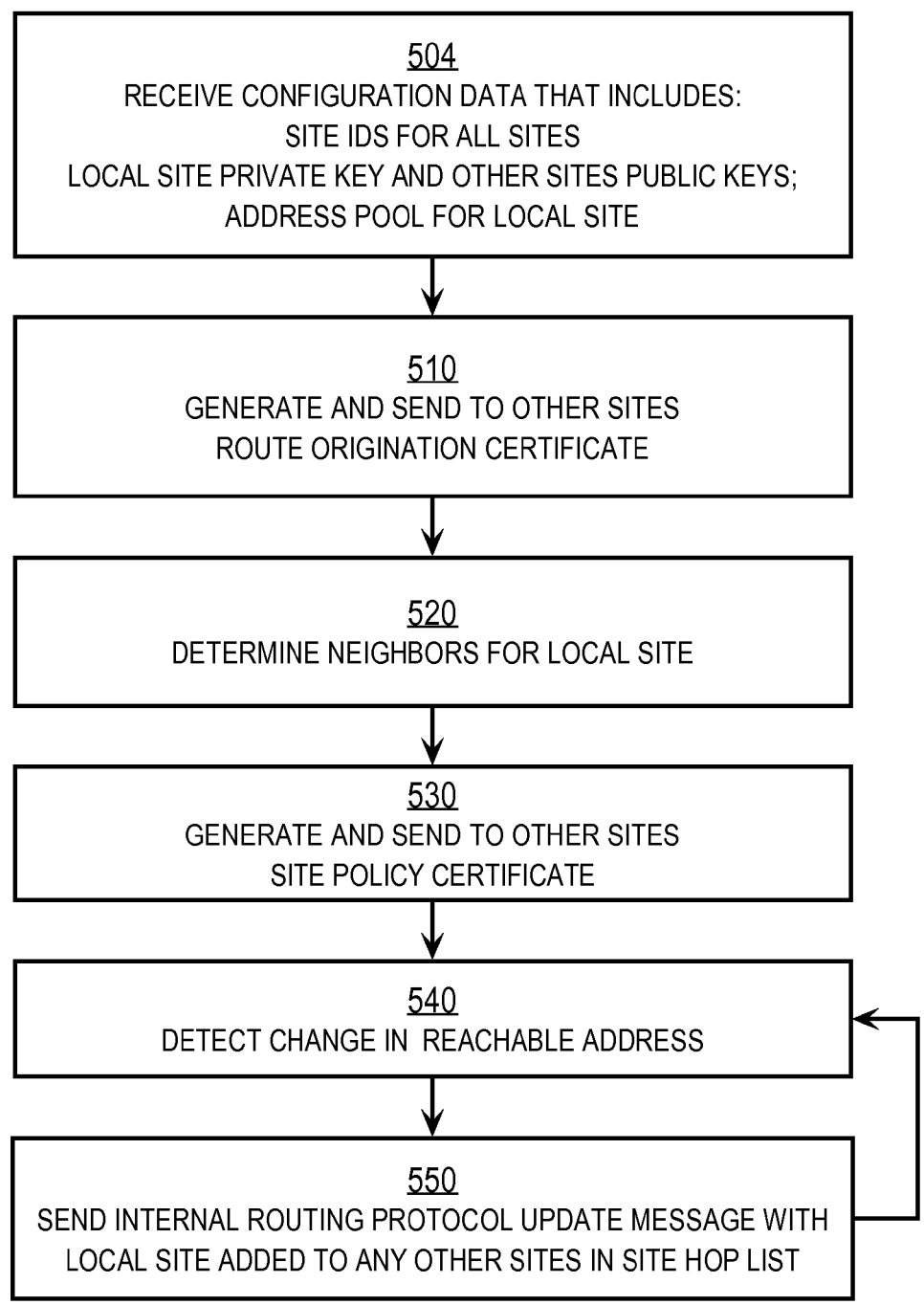
FIG. 5 illustrates an example method in a node at a site.
Figure 6:
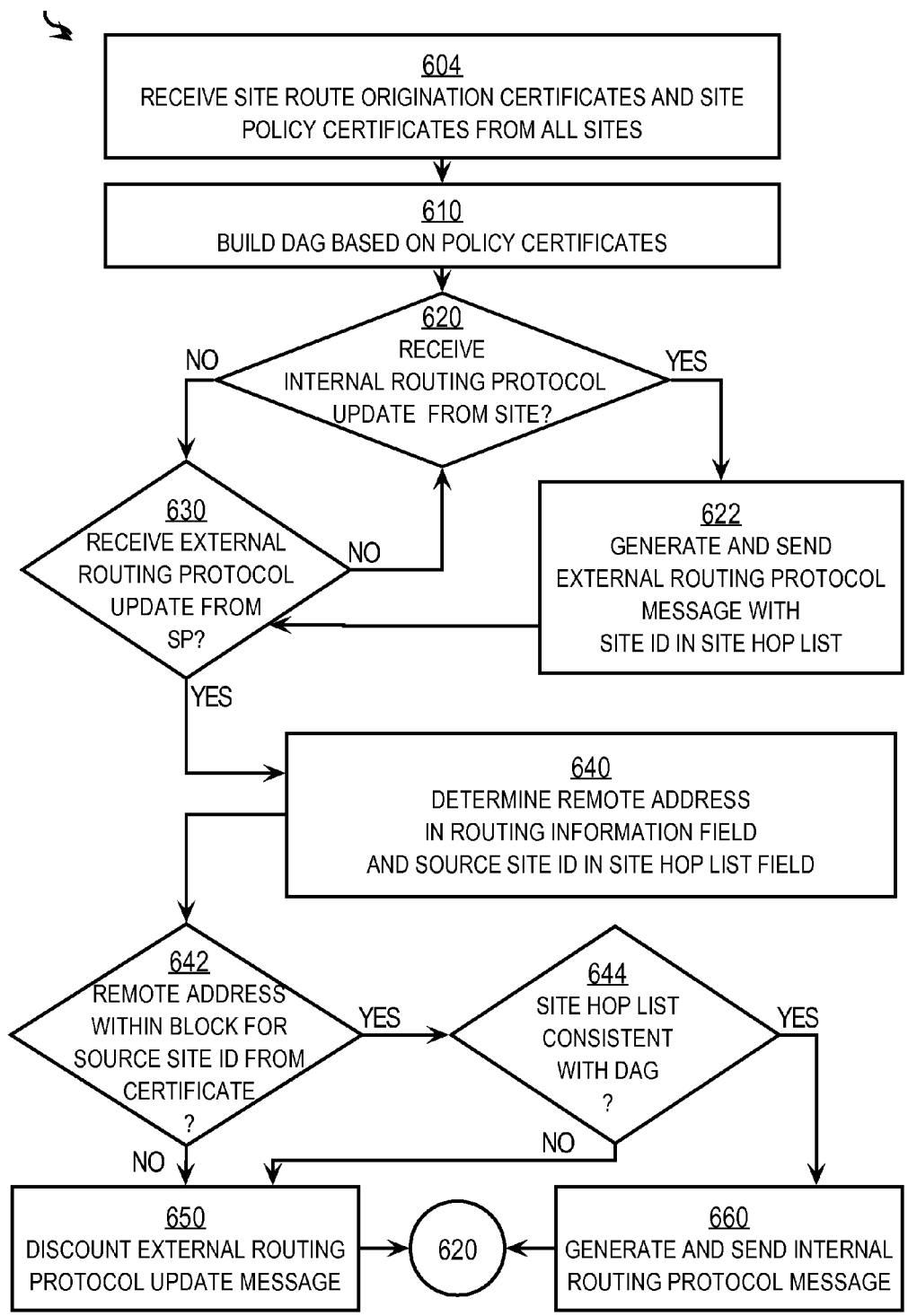
FIG. 6 illustrates an example method in a node at an edge of a site.

FIG. 5 illustrates an example method 500 at a node in a site. Although steps in FIG. 5 and subsequent flow chart, FIG. 6, are show in a particular order for purposes of illustration, in other embodiments, one or more steps may be performed in a different order or overlapping in time, in series or in parallel, or one or more steps may be omitted or added, or changed in some combination of ways. Furthermore, the steps of method 500 may be performed on one or several different nodes in a network, including on one or more nodes of a provider network or a customer network or both. For purposes of illustration, it is assumed that all steps are performed by a single node in each site of a customer network (e.g., CR 123 in site 120e in customer network 120).

In step 504, configuration data is received. Any method may be used to receive this data. For example, in various embodiments, the data is included as a default value in software instructions, is received as manual input from a network administrator on the local or a remote node, is retrieved from a local file or database, or is sent from a different node on the network, either in response to a query or unsolicited, or the data is received using some combination of these methods. For example, in the illustrated embodiment, a human administrator indicates a private key for site 120e, an address of the site authority process 150 on node 122, and a public key to verify messages signed by the site authority process 150. In the illustrated embodiment, further configuration data is received from site authority process 150 in at least one signed message.

The configuration data includes a site ID and a public key for all sites, a private key for the local site, and an address pool for the local site. The distribution of a private key is well known in the art and described, for example in RFC3279. Further configuration data is received from a site authority process. For example, site internal process 170 receives a site ID of SiteE and an address block of 10.5.0.0/16 in one trusted message from site authority process 150. The process 170 then requests and receives a trusted message from site authority process 150 that lists the site IDs and public keys for all the sites, e.g., for site 120a, site 120b, site 120c, site 120d and site 120e on customer network 120. In some embodiments the public key for the requesting site is omitted; e.g., the public key for site 120e is not sent to site 120e in response to the request from site 120e.

In step 510, the node generates and sends a route origination certificate to other nodes on the network based on the configuration data. In some embodiments, step 510 is performed instead by the authority that provides the address block to each site, e.g., by site authority process 150 on node 122. In such embodiments, step 510 is omitted from a process at a node within the local site.

In step 520, the node in the site determines any AS and site neighbors. Each site should have at least one neighbor. Edge sites have at least one AS neighbor. Any method may be used to determine the neighbors of a site. For example, internal routing protocol discovery messages indicate to each node in a site the nodes to which it is connected and this information is flooded throughout the site. Based on the addresses received in the route origination certificates, configured neighbor relationships, and site policy certificates sent from other sites, a node in a site can determine whether any adjacent nodes are neighbors. A site can determine an AS ID of an adjacent provider AS by a message sent from the edge node that negotiates an adjacency under the external routing protocol (e.g., CE router 121 or PE router 111). In some embodiments, step 520 is performed by the edge node (e.g., CE router 121 or PF router 111) itself, rather than by the internal router, e.g., CR 123.

In step 530, the node generates and sends a site policy certificate to other nodes on the network based on the neighbors identified in step 520. In some embodiments, step 530 is performed by the edge node (e.g., CE router 121 or PF router 111) itself, rather than by the internal router (e.g., CR 123). In some embodiments, step 530 is performed on the site authority process, so that a network administrator can configure from a central node all of the authorizations described in the certificates. Sometime after steps 510 and 530, any node in the customer network that is interested is able to construct a site sensitive DAG with associated addresses at each site.

In step 540, after steps 510 and 530, the node detects a change in a reachable address. For example, a new node becomes adjacent to the node or a formerly adjacent node breaks its link to the node. As a further example, the node receives an internal routing protocol update message that indicates a new node is reachable through a neighbor or former node is no longer reachable through that neighbor.

In step 550, in response to the detected change in step 540, the node sends an internal routing protocol update message, as is currently done. In the illustrated embodiment, however, the node adds a site ID for the site to which the node belongs to the list of site IDs, if any, in the site hop list field 348. In some embodiments, if the site ID for node's site is already in the list field 348, it is not added again. In some embodiments in which no site is more than one deep behind an edge site, the site hop list field 348 is omitted and step 550 sends an internal routing protocol update message without a site hop list field 348. Control passes back to step 540 to detect the next change in routing information and report same in another internal routing protocol message.

FIG. 6 illustrates an example method 600 at an edge node at an edge of a site. In some embodiments the edge nodes are the CE routers 121 and in some embodiments the edge nodes are the PE routers 111. In the illustrated embodiment, the edge nodes are the CE routers 121. The edge node converts internal rooting protocol update messages to the external routing protocol update messages, such as to EBGP messages, and back.

In step 604, trusted information is received that indicates an address block for each site, or neighbors of each site, or both. In the illustrated embodiment, step 604 includes receiving the site route origination certificates and the site policy certificates from all sites.

In step 610, a site-sensitive directional asynchronous graph (DAG) is built based on the trusted information received in step 604. In some embodiments, DAG reflects the site policy certificates only. In some embodiments the DAG also reflects the route origination data for each site, as in DAG 400. The DAG permits rapid checking of AS_PATH and site hop list data. The use of a DAG to check a sequence of waypoints along a path is well known in the art. In some embodiments, a DAG is not built and step 610 is omitted.

In step 620, it is determined whether an internal routing protocol update is received at the edge node. Such a message using the internal routing protocol is from the customer site side of the edge node. Such an update should be propagated to other sites across the provider network (e.g., through a layer 3 VPN across provider networks 102).

If it is determined, in step 620, that an internal routing protocol update is received, then control passes to step 622. In step 622, the edge node generates and sends an external routing protocol message with a site ID in the site hop list field. If the internal routing protocol message includes one or more site IDs in a site hop list field 348, then all those site IDs are included in the site hop list field 338 of the external routing protocol update message 330. If the site ID of the edge site that includes or is connected to the edge node is not in the site hop list 348, then the site ID of the edge site is added to the site hop list field 338. In embodiments in which the CE router is in a separate site than other customer nodes away from the provider networks, then the site ID of the CE router and the site ID of a node that originated the routing information is included in the site hop list field 338. Control then passes to step 630.

If it is determined, in step 620, that an internal routing protocol update is not received, then control also passes to step 630. In step 630 it is determined whether an external routing protocol update is received at the edge node. Such a message using the external routing protocol is from the provider network side of the edge node. Such an update message may be suspect and should be validated. If an external routing protocol update message is not received, then control passes back to step 620 to look for an internal routing protocol update message. Thus steps 620 and 630 form a waiting loop to respond to the next update message. In some embodiments, this waiting loop is implemented using routing operating system interrupts.

For purposes of illustration, it is assumed that an external routing protocol update message 330, which originated from PE router 111*a*, is received at edge node CE 121*c*. It is further assumed that the message includes information listed in Table. 3.

TABLE 3

Example external routing protocol update message received at CE 121c.

| IP source | IP address of PE router 111a |
|---|---|
| routing information | Withdrawal of 10.2/16 |
| AS hop list | ASB, ASD, ASE |
| site hop list | SiteE, SiteA |

If it is determined, in step 630, that an external routing protocol update is received, then control passes to step 640. In step 640, the external routing protocol update message is examined to determine two values: a value of a remote address and a value for the source site ID. The value for the remote address is the route that is indicated in the routing information field 334. The value for the source site ID is the site ID of the source of the routing information. Any method may be used to determine the source site ID. In some embodiments, the source site ID is a primary site ID indicated in the site hop list 338. If there is only one site ID in the list, then that is the primary site ID. If there is more than one, the primary site ID is indicated in some way, such as the first ID in a particular order for site IDs when the site hop list in field 338 is an ordered list. In some embodiments, the source site ID is the site ID in the site route origination data associated with the address of the source address in the IP header of the update message 330. Control then passes to step 642.

For the example update message of Table 3, the remote address is 10.2/16 and the source site ID is SiteE.

In step 642, it is determined whether the remote address is within the address block for the source site ID based on the site route origination certificates received. If so, then control passes to step 644, described below. If not, then control passes to step 650. In step 650, the external routing protocol update message is discounted. In the illustrated embodiment, the external routing protocol message is discarded. Control then passes back to step 620 to loop with step 630 until the next update message is received.

For example, it is determined in step 642 whether the remote address range 10.2/16 is within the address block for SiteE. From DAG 400 it is determined that the address block for SiteE (square node 421*e*) is 10.5/16, which does not include remote addresses 10.2/16, therefore control passes to step 650. In step 650 the update message of Table 3 is discounted and control passes back to step 620 to receive the next internal or external update message.

For purposes of illustration, it is assumed that the next update message is an external update message with contents listed in Table 4. The contents of Table 4 are the same as the contents of Table 3, except that the address in the routing information field is correct for site 120*e*.

TABLE 4

Next example external routing protocol update message received at CE 121c.

| IP source | IP address of PE router 111a |
|---|---|
| routing information | Withdrawal of 10.5/16 |
| AS hop list | ASB, ASD, ASE |
| site hop list | SiteE, SiteA |

In step 640 it is determined that the remote address range is 10.5/16 and the source site ID is again SiteE. In step 642 it is determined that the address block for SiteE (square node 421e) is 10.5/16, which does include remote addresses 10.5/16.

If it is determined, in step 642, that the remote address is within the address block for the source site ID, then control passes to step 644. In step 644 it is determined whether the site hop list from field 338 is consistent with the DAG. If a DAG is not built, it is determined in step 644 whether the site hop list from field 338 is consistent with the trusted information received during step 604. If not, control passes to step 650 to discount the external routing protocol update message, as described above. However, if the site hop list is consistent with the trusted data, then control passes to step 660. In step 660, an internal routing protocol update message is generated and sent to the local site.

For the example update message of Table 4, the site hop list from field 338 indicates the following path: SiteE, SiteA, ASB. According to DAG 400, however, SiteA (square node 421a) is connected to ASA (circle node 402a) not ASB (circle node 402b). Therefore the site hop data is not consistent with the trusted information received during step 604; and control passes to step 650. The external routing protocol update message is discounted.

In some embodiments, the external routing protocol does not provide the AS hop list and so the first AS hop is included in the site hop list, during step 622.

In some embodiments, the external routing protocol does not provide policy certificates 220 with neighbor AS list, so that the DAG constructed in step 610 does not include circle nodes 402b, 402c, 402d and 402f. However, test 644 is still successful because a CE router 121 is connected to a PE router 111 that knows what its own AS ID is. Thus CE router 121a knows that SiteA is connected to ASA and this information is passed to all sites in a site policy certificate 320. The test in step 644 successfully determines invalid data even if DAG includes only circle nodes 402a and 402e for neighboring ASA and ASE, respectively.

An advantage of the method 600 is that a customer need not spend the resources to set up secure encrypted channels between every pair of sites. Instead, a customer can engage a service provider to provide a virtual private network. Internal routing protocol information passed across the VPN can be checked to detect invalid routing information that might arise from a wide range of causes, including service provider error, negligence and malfeasance. It is noted that certain errors might pass the validity checks performed above. For example, a clever adversary might be able to send routing information that indicates a site is connected when in fact the site is no longer connected. To spoof site 120c, the clever adversary sends an external routing protocol update message through AS 102e with SiteC in the site hop list field 338 and with addresses in the range 10.3.0.0/16 and with ASE in the AS_PATH attribute (or rely on a PE router 111 in AS 102e adding ASE to the AS_PATH attribute). However, many random and arbitrary modifications to routing information will be filtered out by the method.

5.0 Implementation Mechanisms—Hardware Overview

FIG. 7 illustrates a computer system 700 upon which an embodiment of the invention may be implemented. The preferred embodiment is implemented using one or more computer programs running on a network element such as a router device. Thus, in this embodiment, the computer system 700 is a router.

Computer system 700 includes a communication mechanism such as a bus 710 for passing information between other internal and external components of the computer system 700. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). A sequence of binary digits constitutes digital data that is used to represent a number or code for a character. A bus 710 includes many parallel conductors of information so that information is transferred quickly among devices coupled to the bus 710. One or more processors 702 for processing information are coupled with the bus 710. A processor 702 performs a set of operations on information. The set of operations include bringing information in from the bus 710 and placing information on the bus 710. The set of operations also typically include comparing two or more units of information, shifting positions of units of information, and combining two or more units of information, such as by addition or multiplication. A sequence of operations to be executed by the processor 702 constitute computer instructions.

Computer system 700 also includes a memory 704 coupled to bus 710. The memory 704, such as a random access memory (RAM) or other dynamic storage device, stores information including computer instructions. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of computer instructions. The computer system 700 also includes a read only memory (ROM) 706 or other static storage device coupled to the bus 710 for storing static information, including instructions, that is not changed by the computer system 700. Also coupled to bus 710 is a non-volatile (persistent) storage device 708, such as a magnetic disk or optical disk, for storing information, including instructions, that persists even when the computer system 700 is turned off or otherwise loses power.

The term computer-readable medium is used herein to refer to any medium that participates in providing information to processor 702, including instructions for execution. Such a medium may take many forms, including, but not limited to, non-volatile media, volatile media and transmission media. Non-volatile media include, for example, optical or magnetic disks, such as storage device 708. Volatile media include, for example, dynamic memory 704. Transmission media include, for example, coaxial cables, copper wire, fiber optic cables, and waves that travel through space without wires or cables, such as acoustic waves and electromagnetic waves, including radio, optical and infrared waves. Signals that are transmitted over transmission media are herein called carrier waves.

Common forms of computer-readable media include, for example, a floppy disk, a flexible disk, a hard disk, a magnetic tape or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read.

Information, including instructions, is provided to the bus 710 for use by the processor from an external terminal 712, such as a terminal with a keyboard containing alphanumeric keys operated by a human user, or a sensor. A sensor detects conditions in its vicinity and transforms those detections into signals compatible with the signals used to represent information in computer system 700. Other external components of terminal 712 coupled to bus 710, used primarily for interacting with humans, include a display device, such as a cathode ray tube (CRT) or a liquid crystal display (LCD) or a plasma screen, for presenting images, and a pointing device, such as a mouse or a trackball or cursor direction keys, for controlling a position of a small cursor image presented on the display and issuing commands associated with graphical elements presented on the display of terminal 712. In some embodiments, terminal 712 is omitted.

Computer system 700 also includes one or more instances of a communications interface 770 coupled to bus 710. Communication interface 770 provides a two-way communication coupling to a variety of external devices that operate with their own processors, such as printers, scanners, external disks, and terminal 712. Firmware or software running in the computer system 700 provides a terminal interface or character-based command interface so that external commands can be given to the computer system. For example, communication interface 770 may be a parallel port or a serial port such as an RS-232 or RS-422 interface, or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends and receives electrical, acoustic or electromagnetic signals, including infrared and optical signals, which carry information streams, such as digital data. Such signals are examples of carrier waves In the illustrated embodiment, special purpose hardware, such as an application specific integrated circuit (IC) 720, is coupled to bus 710. The special purpose hardware is configured to perform operations not performed by processor 702 quickly enough for special purposes. Examples of application specific ICs include graphics accelerator cards for generating images for display, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware. Logic encoded in one or more tangible media includes one or both of computer instructions and special purpose hardware.

In the illustrated computer used as a router, the computer system 700 includes switching system 730 as special purpose hardware for switching information for flow over a network. Switching system 730 typically includes multiple communications interfaces, such as communications interface 770, for coupling to multiple other devices. In general, each coupling is with a network link 732 that is connected to another device in or attached to a network, such as local network 780 in the illustrated embodiment, to which a variety of external devices with their own processors are connected. In some embodiments an input interface or an output interface or both are linked to each of one or more external network elements. Although three network links 732a, 732b, 732c are included in network links 732 in the illustrated embodiment, in other embodiments, more or fewer links are connected to switching system 730. Network links 732 typically provides information communication through one or more networks to other devices that use or process the information. For example, network link 732b may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790. A computer called a server 792 connected to the Internet provides a service in response to information received over the Internet. For example, server 792 provides routing information for use with switching system 730.

The switching system 730 includes logic and circuitry configured to perform switching functions associated with passing information among elements of network 780, including passing information received along one network link, e.g. 732a, as output on the same or different network link, e.g., 732c. The switching system 730 switches information traffic arriving on an input interface to an output interface according to pre-determined protocols and conventions that are well known. In some embodiments, switching system 730 includes its own processor and memory to perform some of the switching functions in software. In some embodiments, switching system 730 relies on processor 702, memory 704, ROM 706, storage 708, or some combination, to perform one or more switching functions in software. For example, switching system 730, in cooperation with processor 704 implementing a particular protocol, can determine a destination of a packet of data arriving on input interface on link 732a and send it to the correct destination using output interface on link 732c. The destinations may include host 782, server 792, other terminal devices connected to local network 780 or Internet 790, or other routing and switching devices in local network 780 or Internet 790.

The invention is related to the use of computer system 700 for implementing the techniques described herein. According to one embodiment of the invention, those techniques are performed by computer system 700 in response to processor 702 executing one or more sequences of one or more instructions contained in memory 704. Such instructions, also called software and program code, may be read into memory 704 from another computer-readable medium such as storage device 708. Execution of the sequences of instructions contained in memory 704 causes processor 702 to perform the method steps described herein. In alternative embodiments, hardware, such as application specific integrated circuit 720 and circuits in switching system 730, may be used in place of or in combination with software to implement the invention. Thus, embodiments of the invention are not limited to any specific combination of hardware and software.

The signals transmitted over network link 732 and other networks through communications interfaces such as interface 770, which carry information to and from computer system 700, are example forms of carrier waves. Computer system 700 can send and receive information, including program code, through the networks 780, 790 among others, through network links 732 and communications interfaces such as interface 770. In an example using the Internet 790, a server 792 transmits program code for a particular application, requested by a message sent from computer 700, through Internet 790, ISP equipment 784, local network 780 and network link 732b through communications interface in switching system 730. The received code may be executed by processor 702 or switching system 730 as it is received, or may be stored in storage device 708 or other non-volatile storage for later execution, or both. In this manner, computer system 700 may obtain application program code in the form of a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to an infra-red signal, a carrier wave serving as the network link 732b. An infrared detector serving as communications interface in switching system 730 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702 or switching system 730.

6.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method comprising:
    receiving, at a particular node, authenticated site data that can be trusted and that includes;
        site identifier data that indicates a unique site identifier (ID) for each site that comprises one or more network nodes among a plurality of sites for a first network that is under administrative control of a customer and that uses an internal routing protocol, wherein a plurality of edge sites of the plurality of sites are separate from each other and connected to a second network that is under separate administrative control of at least one network service provider, and
        address block data that indicates a set of one or more network addresses that are associated with each site of the plurality of sites;
    identifying a route between the nodes;
    designating a trust level for the route based on the authenticated site data;
    discounting an external routing protocol message after comparing it to the authenticated site data;
    receiving from a local site connected to the particular node an internal routing protocol message that includes data that indicates a change in a network address reachable at the local site;
    generating an outbound external routing protocol message that includes data that indicates the change in the address reachable, and data that indicates a local site ID that is associated with the local site, wherein the generating further comprises determining whether the internal routing protocol message includes data that indicates a local source site ID that is different from the local site ID, and wherein if it is determined that the internal routing protocol message includes data that indicates a local source site ID that is different from the local site ID, then generating the outbound external routing protocol message that includes data that indicates the local source site ID; and
    sending the outbound external routing protocol message over the second network.

2. A method as recited in claim 1, said step of discounting the external routing protocol message further comprising the steps of:
    receiving the external routing protocol message that includes data that indicates a source site ID for a source site of the plurality of sites and a change in a remote network address reachable at the source site;
    determining whether the remote address is associated with the source site ID based on the authenticated site data; and
    if it is determined that the remote address is not associated with the source site ID, then discounting the external routing protocol message.

3. A method as recited in claim 1, wherein:
    the method further comprises receiving authenticated site adjacency data that can be trusted and that indicates, for each edge site of the plurality of edge sites, a provider ID for a network service provider that has administrative control of a provider edge node in the second network to which the edge site is connected, whereby the provider ID is adjacent to the site ID of the edge site; and
    said step of discounting the external routing protocol message further comprises the steps of:
        receiving an external routing protocol message that includes data that indicates a first provider ID through which the external routing protocol message passes and a first edge site ID for an edge site through which passes an internal routing protocol message that indicates the change in the remote network address reachable at the source site;
        determine whether the first provider ID is adjacent to the first edge site ID based on the site adjacency data; and
        if it is determined that the first provider ID is not adjacent to the first edge site ID, then discounting the external routing protocol message.

4. A method as recited in claim 3, wherein the first edge site is the same as the source site.

5. A method as recited in claim 3, wherein the first edge site comprises a single customer edge node of the first network.

6. A method as recited in claim 3, wherein:
    said step of receiving authenticated site adjacency data further comprises receiving authenticated site adjacency data that indicates, for each site ID every site ID of a different site that is connected to the site;
    the first edge site is different from the source site;
    said step of receiving an external routing protocol message further comprises receiving an external routing protocol message that includes site hop data that indicates a sequence of site IDs for sites through which passes an internal routing protocol message that indicates the change in the remote network address reachable at the source site; and
    the method further comprises
        determining whether the site hop data is consistent with the adjacency data, and
        if it is determined that the site hop data is not consistent with the adjacency data, then discounting the external routing protocol message.

7. A method as recited in claim 3, wherein:
the second network comprises a plurality of autonomous systems under administrative control of a corresponding plurality of different service providers; and
said step of receiving the external routing protocol message further comprises receiving the external routing protocol message that includes service provider hop data that indicates a plurality of provider IDs through which the external routing protocol message passes.

8. A method as recited in claim 1, said step of generating the outbound external routing protocol message further comprising:
determining whether the internal routing protocol message includes data that indicates a local hop site ID that is different from the local site ID and the local source site ID; and
if it is determined that the internal routing protocol message includes data that indicates a local hop site ID that is different from the local site ID and the local source site ID, then generating the outbound external routing protocol message that includes data that indicates the local hop site ID.

9. A method as recited in claim 1, wherein the particular node is a provider edge node in the second network.

10. A method as recited in claim 1, wherein the particular node is a customer edge node in the first network.

11. A method as recited in claim 1, said step of receiving authenticated site data further comprising receiving a trusted route origination message that includes:
a particular site ID for a particular site of the plurality of sites;
particular address block data that indicates a set of one or more network addresses that are associated with the particular site; and
signature data that indicates, when validated at any site of the plurality of sites, that the trusted route origination message is authentic according to a trusted authority.

12. A method as recited in claim 3, said step of receiving authenticated site adjacency data further comprising receiving a trusted site adjacency message that includes:
a particular site ID for a particular site;
neighbor provider data that indicates a set of one or more neighbor providers of the at least one network service provider, wherein the particular site is connected to a node under administrative control of each neighbor provider; and
signature data that indicates, when validated at any site of the plurality of sites, that the trusted site adjacency message is authentic according to a trusted authority.

13. A method as recited in claim 12, said step of receiving the trusted site adjacency message further comprising receiving a trusted site adjacency message that includes neighbor site data that indicates a set of one or more neighbor sites of the plurality of sites, wherein the particular site is connected to a node in each neighbor site.

14. An apparatus comprising:
means for receiving authenticated site data that can be trusted and that includes
site identifier data that indicates a unique site identifier (ID) for each site that comprises one or more network nodes among a plurality of sites for a first network that is under administrative control of a customer and that uses an internal routing protocol, wherein a plurality of edge sites of the plurality of sites are separate from each other and connected to a second network that is under separate administrative control of at least one network service provider, and
address block data that indicates a set of one or more network addresses that are associated with each site of the plurality of sites; and
means for identifying a route between the nodes;
means for designating a trust level for the route based on the authenticated site data;
means for discounting an external routing protocol message after comparing it to the authenticated site data;
means for receiving from a local site connected to the particular node an internal routing protocol message that includes data that indicates a change in a network address reachable at the local site;
means for generating an outbound external routing protocol message that includes data that indicates the change in the address reachable, and data that indicates a local site ID that is associated with the local site, wherein the means for generating further comprises means for determining whether the internal routing protocol message includes data that indicates a local source site ID that is different from the local site ID, and wherein if it is determined that the internal routing protocol message includes data that indicates a local source site ID that is different from the local site ID, then generating the outbound external routing protocol message that includes data that indicates the local source site ID; and
means for this sending the outbound external routing protocol message over the second network.

15. An apparatus comprising:
a network interface that is configured for communicating a data packet with a packet-switched network; and
logic encoded in one or more tangible media for execution and, when executed, operable for:
receiving authenticated site data that can be trusted and that includes;
site identifier data that indicates a unique site identifier (ID) for each site that comprises one or more network nodes among a plurality of sites for a first network that is under administrative control of a customer and that uses an internal routing protocol, wherein a plurality of edge sites of the plurality of sites are separate from each other and connected to a second network that is under separate administrative control of at least one network service provider, and
address block data that indicates a set of one or more network addresses that are associated with each site of the plurality of sites;
identifying a route between the nodes;
designating a trust level for the route based on the authenticated site data;
discounting an external routing protocol message after comparing it to the authenticated site data;
receiving from a local site connected to the particular node an internal routing protocol message that includes data that indicates a change in a network address reachable at the local site;
generating an outbound external routing protocol message that includes data that indicates the change in the address reachable, and data that indicates a local site ID that is associated with the local site, wherein the generating further comprises determining whether the internal routing protocol message includes data that indicates a local source site ID that is different from the local site ID, and wherein if it is determined that the internal routing protocol message includes data that indicates a local source site ID that is different from the local site ID, then generating the outbound external routing protocol message that includes data that indicates the local source site ID; and sending the outbound external routing protocol message over the second network.

16. An apparatus as recited in claim 15, said discounting the external routing protocol message further comprising:

receiving through the network interface the external routing protocol message that includes data that indicates a source site ID for a source site of the plurality of sites and a change in a remote network address reachable at the source site;

determining whether the remote address is associated with the source site ID based on the authenticated site data; and if it is determined that the remote address is not associated with the source site ID, then discounting the external routing protocol message.

17. An apparatus as recited in claim 15, wherein:

the logic, when executed, is further operable for receiving authenticated site adjacency data that indicates, for each edge site of the plurality of edge sites, a provider ID for a network service provider that has administrative control of a provider edge node in the second network to which the edge site is connected, whereby the provider ID is adjacent to the site ID of the edge site;

said discounting the external routing protocol message further comprises receiving through the network interface the external routing protocol message that includes data that indicates a first provider ID through which the external routing protocol message passes and a first edge site ID for an edge site through which passes an internal routing protocol message that indicates the change in the remote network address reachable at the source site, and determining whether the first provider ID is adjacent to the first edge site ID based on the site adjacency data, and if it is determined that the first provider ID is not adjacent to the first edge site ID, then discounting the external routing protocol message.

18. An apparatus as recited in claim 17, wherein the first edge site is the same as the source site.

19. An apparatus as recited in claim 17, wherein the first edge site comprises a single customer edge node of the first network.

20. An apparatus as recited in claim 17, wherein:

said receiving authenticated site adjacency data further comprises receiving authenticated site adjacency data that indicates, for each site ID, every site ID of a different site that is connected to the site;

the first edge site is different from the source site;

said receiving the external routing protocol message further comprises receiving the external routing protocol message that includes site hop data that indicates a sequence of site IDs for sites through which passes an internal routing protocol message that indicates the change in the remote network address reachable at the source site; and the logic, when executed, is further operable for determining whether the site hop data is consistent with the adjacency data, and if it is determined that the site hop data is not consistent with the adjacency data, then discounting the external routing protocol message.

21. An apparatus as recited in claim 17, wherein:

the second network comprises a plurality of autonomous systems under administrative control of a corresponding plurality of different service providers; and said receiving the external routing protocol message further comprises receiving the external routing protocol message that includes service provider hop data that indicates a plurality of provider IDs through which the external routing protocol message passes.

22. An apparatus as recited in claim 15, said step of generating the outbound external routing protocol message further comprising:

determining whether the internal routing protocol message includes data that indicates a local hop site ID that is different from the local site ID and the local source site ID; and if it is determined that the internal routing protocol message includes data that indicates a local hop site ID that is different from the local site ID and the local source site ID, then generating the outbound external routing protocol message that includes data that indicates the local hop site ID.

23. An apparatus as recited in claim 15, said receiving authenticated site data comprising receiving a trusted route origination message that includes:

a particular site ID for a particular site, particular address block data that indicates a set of one or more network addresses that are associated with the particular site, and signature data that indicates, when validated at any site of the plurality of sites, that the trusted route origination message is authentic according to a trusted authority.

24. An apparatus as recited in claim 17, said receiving authenticated site data comprising receiving a trusted site adjacency message that includes:

a particular site ID for a particular site of the plurality of sites, neighbor provider data that indicates a set of one or more neighbor providers of the at least one network service provider, wherein the particular site is connected to a node under administrative control of each neighbor provider, and signature data that indicates, when validated at any site of the plurality of sites, that the trusted site adjacency message is authentic according to a trusted authority.

25. An apparatus as recited in claim 24, said receiving the trusted site adjacency message further comprising receiving the trusted site adjacency message that includes neighbor site data that indicates a set of one or more neighbor sites of the plurality of sites, wherein the particular site is connected to a node in each neighbor site.

* * * * *